United States Patent
Itou

(10) Patent No.: US 10,417,836 B2
(45) Date of Patent: Sep. 17, 2019

(54) DEVICE MAINTENANCE APPARATUS, DEVICE MAINTENANCE METHOD, DEVICE MAINTENANCE PROGRAM, AND RECORDING MEDIUM

(71) Applicant: Yokogawa Electric Corporation, Tokyo (JP)

(72) Inventor: Toshihiro Itou, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 195 days.

(21) Appl. No.: 15/606,143

(22) Filed: May 26, 2017

(65) Prior Publication Data
US 2017/0345224 A1    Nov. 30, 2017

(30) Foreign Application Priority Data
May 31, 2016 (JP) .................. 2016-108722

(51) Int. Cl.
| | | |
|---|---|---|
| G07C 3/04 | (2006.01) | |
| G06F 3/0483 | (2013.01) | |
| G05B 23/02 | (2006.01) | |
| G06Q 10/06 | (2012.01) | |
| G06Q 10/00 | (2012.01) | |
| G06Q 50/06 | (2012.01) | |

(52) U.S. Cl.
CPC ........... *G07C 3/04* (2013.01); *G05B 23/0267* (2013.01); *G06F 3/0483* (2013.01); *G06Q 10/0631* (2013.01); *G06Q 10/20* (2013.01); *G06Q 50/06* (2013.01)

(58) Field of Classification Search
CPC .............. G05B 23/0267; G06F 3/0483; G06Q 10/0631; G06Q 10/20; G06Q 50/06; G07C 3/04; Y04S 10/54
USPC ......... 702/182, 184, 121; 707/736; 715/736, 715/748; 700/12, 83
See application file for complete search history.

(56) References Cited

U.S. PATENT DOCUMENTS

| | | | |
|---|---|---|---|
| 2004/0139085 A1* | 7/2004 | Eryurek | G05B 19/418 |
| 2013/0190902 A1 | 7/2013 | Itou | |
| 2014/0352813 A1 | 12/2014 | Tharaldson et al. | |
| 2015/0160630 A1 | 6/2015 | Makishima et al. | |
| 2015/0160816 A1 | 6/2015 | Furihata | |
| 2015/0314840 A1 | 11/2015 | Okuda et al. | |
| 2016/0140513 A1 | 5/2016 | Yoshikawa | |

FOREIGN PATENT DOCUMENTS

| | | |
|---|---|---|
| EP | 2687926 A2 | 1/2014 |
| EP | 2889709 A2 | 7/2015 |
| JP | 2004-318262 A | 11/2004 |
| JP | 2015-109011 A | 6/2015 |
| WO | 2013/132999 A1 | 9/2013 |

* cited by examiner

*Primary Examiner* — John H Le
(74) *Attorney, Agent, or Firm* — Sughrue Mion, PLLC

(57) ABSTRACT

A device maintenance apparatus has a display, in which the display displays a first screen generated based on first device information of a maintenance-target device, a second screen generated based on second device information of the device, and a third screen generated based on the first device information and the second device information.

15 Claims, 14 Drawing Sheets

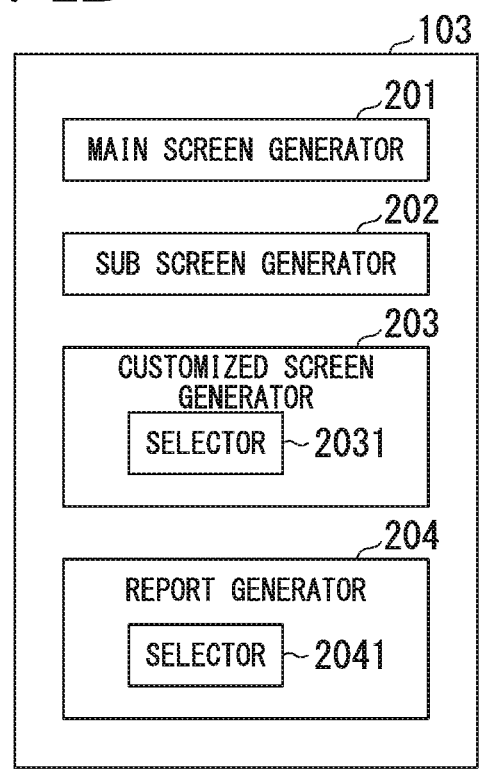

FIG. 5

| DISPLAY PERIOD | OPERATION LOG | | | | | FILTER | |
|---|---|---|---|---|---|---|---|
| ● ALL DAYS | DEVICE | | SOURCE | DATE/TIME | USER | MESSAGE | |
| ○ SPECIFY A DATE | RCCT4 | ▶ | DTM Works | 2016/03/23 16:26:58 | DefaultUser | Function Name:[Device stauts Descriptor: | |
| MARCH 2016 | RCCT4 | ▶ | DTM Works | 2016/03/23 16:26:27 | DefaultUser | General Notification Message Select Value:Yes | |
| Sun Mon Tue Wed Thu Fri Sat | RCCT4 | ▶ | DTM Works | 2016/03/23 16:26:52 | DefaultUser | General Notification Message Select Value:Yes | |
| 28 29 1 2 3 4 5 | RCCT4 | ▶ | DTM Works | 2016/03/23 16:26:45 | DefaultUser | General Notification Message Select Value:Yes | |
| 6 7 8 9 10 11 12 | RCCT4 | ▶ | DTM Works | 2016/03/23 16:26:43 | DefaultUser | General Notification Message Select Value:Yes | |
| 13 14 15 16 17 18 19 | RCCT4 | ▶ | DTM Works | 2016/03/23 16:26:35 | DefaultUser | General Notification Message Select Value:Yes | |
| 20 21 22 23 [24] 25 26 | RCCT4 | ▶ | DTM Works | 2016/03/23 16:26:34 | DefaultUser | General Notification Message Select Value:Yes | |
| 27 28 29 30 31 1 2 | RCCT4 | ▶ | DTM Works | 2016/03/23 16:26:15 | DefaultUser | General Notification Message Select Value:Yes | |
| 3 4 5 6 7 8 9 | RCCT4 | ▶ | DTM Works | 2016/03/23 16:26:10 | DefaultUser | General Notification Message Select Value:Yes | |
| ○ SPECIFY A PERIOD | RCCT4 | ▶ | DTM Works | 2016/03/23 16:26:02 | DefaultUser | General Notification Message Select Value:Yes | |
| FROM 2016/03/10 15 | RCCT4 | ▶ | DTM Works | 2016/03/23 16:25:55 | DefaultUser | General Notification Message Select Value:Yes | |
| TO 2016/03/24 15 | RCCT4 | ▶ | DTM Works | 2016/03/18 12:39:30 | DefaultUser | General Notification Message Select Value:Yes | |
| | HART | | DTM Works | 2016/03/17 21:57:23 | DefaultUser | General Notification Message Select Value:Yes | |
| | HART | | DTM Works | 2016/03/17 21:57:20 | DefaultUser | General Notification Message Select Value:Yes | |
| | HART | | DTM Works | 2016/03/17 21:56:49 | DefaultUser | General Notification Message Select Value:Yes | |
| | HART | | DTM Works | 2016/03/17 21:56:34 | DefaultUser | General Notification Message Select Value:Yes | |

FIG. 6

| ITEMS | | | |
|---|---|---|---|
| DISPLAY PERIOD | | ALL DAYS | |
| | | SPECIFY DATE | |
| | | SPECIFY PERIOD | |
| FILTERS | DISPLAY ALL | | |
| | DEVICE TAG | | |
| | CATEGORY | SETTING | |
| | | INSPECTION | |
| | | MAINTENANCE MANAGEMENT | |
| | | SYSTEM | |
| | | PRM | |

| FILE (F) VIEW (V) ACTION (A) TOOLS (T) HELP (H) | | 2000 |
|---|---|---|
| ⟳ UPDATE  ✗ CANCEL | | |

DEVICE NAVIGATOR <

ALL

COMMUNICATION FORMAT
- ☐ HART
- ☐ FOUNDATION
- ☐ PROFIBUS
- ☐ BRAIN
- ☐ ISAIDO
- ☐ Modbus
- ☐ Other

FAVORITES

> DEVICE MAINTENANCE INFORMATION

DEVICE INFORMATION / NOTES / IMAGE / OPERATION LOG / PARAMETERS / ATTACHMENTS

BASIC INFORMATION

| DEVICE TAG | DRS |
|---|---|
| DEVICE ID | 3755000709 |
| TAG COMMENT | |
| COMMUNICATION FORMAT | HART |
| VENDER | YOKOGAWA |
| MANUFACTURER ID | 0x000037 |
| CATEGORY | |
| MODEL | |
| DEVICE TYPE | 0x3755 |
| REVISION | 01 |
| DEVICE REVISION | 1 |
| ADDRESS | 0 |
| COMMUNICATION PATH | (Built-in Connection) |

MAINTENANCE INFORMATION

| PRM PLANT HIERARCHY LEVEL | |
|---|---|
| DEVICE STATUS | WARNING |
| STATUS UPDATE DATE/TIME | 2016/03/08 07:17 |
| LOOP NAME | |
| DELIVERY DATE | SELECT DATE |
| STARTUP DATE | SELECT DATE |
| PRIORITY | |

USER ID: DEFAULT USER

FIG. 10

| Device | Date | Source | User | Message | NOTES |
|---|---|---|---|---|---|
| SAMPLE1 (EJX_EXP) | 2016/03/23 16:26:58 | Images | DefaultUser | Update Image. | LEAVE MESSAGE |
| SAMPLE1 (EJX_EXP) | 2016/03/23 16:26:27 | Images | DefaultUser | Update Image. | LEAVE MESSAGE |
| SAMPLE1 (EJX_EXP) | 2016/03/23 16:26:52 | Images | DefaultUser | Update Image. | LEAVE MESSAGE |
| SAMPLE1 (EJX_EXP) | 2016/03/23 16:26:45 | Images | DefaultUser | Update Image. | LEAVE MESSAGE |
| SAMPLE1 (EJX_EXP) | 2016/03/23 16:26:43 | Images | DefaultUser | Update Image. | LEAVE MESSAGE |
| SAMPLE1 (EJX_EXP) | 2016/03/23 16:26:35 | Images | DefaultUser | Update Image. | LEAVE MESSAGE |
| SAMPLE1 (EJX_EXP) | 2016/03/23 16:26:34 | Images | DefaultUser | Update Image. | LEAVE MESSAGE |
| SAMPLE1 (EJX_EXP) | 2016/03/23 16:26:15 | Images | DefaultUser | Update Image. | LEAVE MESSAGE |
| SAMPLE1 (EJX_EXP) | 2016/03/23 16:26:10 | Images | DefaultUser | Update Image. | LEAVE MESSAGE |
| SAMPLE1 (EJX_EXP) | 2016/03/23 16:26:02 | Images | DefaultUser | Update Image. | LEAVE MESSAGE |
| SAMPLE1 (EJX_EXP) | 2016/03/23 16:25:55 | Images | DefaultUser | Update Image. | LEAVE MESSAGE |
| SAMPLE1 (EJX_EXP) | 2016/03/18 12:39:30 | Images | DefaultUser | Update Image. | LEAVE MESSAGE |
| SAMPLE1 (EJX_EXP) | 2016/03/17 21:57:23 | Images | DefaultUser | Update Image. | LEAVE MESSAGE |

| History | | | | |
|---|---|---|---|---|
| ○ Date and Time ○ Device Tag ⦿ Input Loop Check | | | | |
| Device | Test Result | Date | Message | NOTES |
| LC100021 | PASS | 2016/03/23 16:26:27 | – | LEAVE MESSAGE |
| FT3211B | PASS | 2016/03/23 16:26:52 | – | LEAVE MESSAGE |
| TC00234 | FAIL | 2016/03/23 16:26:45 | Device is not Good Condition. | LEAVE MESSAGE |
| TC00011 | PASS | 2016/03/23 16:26:43 | – | LEAVE MESSAGE |
| TC00022 | PASS | 2016/03/23 16:26:35 | – | LEAVE MESSAGE |
| TC00033 | PASS | 2016/03/23 16:26:34 | – | |
| TC00044 | PASS | 2016/03/23 16:26:15 | – | |

DEVICE MAINTENANCE APPARATUS, DEVICE MAINTENANCE METHOD, DEVICE MAINTENANCE PROGRAM, AND RECORDING MEDIUM

CROSS-REFERENCE TO RELATED APPLICATION

This application is based upon and claims the benefit of priority from Japanese Patent Application No. 2016-108722, filed May 31, 2016; the entire contents of which are incorporated herein by reference.

FIELD OF ART

The present invention relates to a device maintenance apparatus, a device maintenance method, a device maintenance program, and a recording medium.

BACKGROUND ART

In industrial plants such as chemical plants, plants that manage and control well heads such as in gas fields or petroleum fields, and the surrounding areas, plants that manage and control electrical generation such as hydroelectric, thermoelectric, and nuclear power generation, plants that manage and control environmental electric power such as from solar light or wind power, or a plant that manages and controls water and sewage or a dam, distributed control systems (DCSs) to which on-site devices such as measuring instruments or actuators known as field devices and control devices that controls them are connected via a communication means are built to implement a high degree of automated operation. In a plant in which such a distributed control system is implemented, from the standpoint of preventing erroneous operation and maintaining measurement accuracy, operators maintain field devices (hereinafter sometimes abbreviated "devices"), either periodically or irregularly.

The maintenance of field devices, for example, is performed using a device maintenance apparatus capable of communication with a field device, either wirelessly or by cable. The device maintenance apparatus, for example, is a computer such as a laptop or tablet computer, a PDA (personal digital assistant), or a smartphone into which a dedicated program for performing maintenance on the field device has been installed. The field device can hold one or a plurality of device information. Device information is information regarding the field device, being, for example, information for setting operation of the field device, information indicating the state of the field device, or identification of the field device. The device maintenance apparatus reads and verifies the device information set in the field device, sets new device information into the field device, or changes the device information set in the field device.

The device maintenance apparatus displays on a display screen the history of device information acquired from the maintenance-target field device as history information. The device maintenance apparatus also specifies the field device and displays maintenance information regarding maintenance of a specified field device (refer to, for example, Patent Reference 1). The device information included in the history information or the device information included in the maintenance information can be displayed as device information extracted by extraction conditions, by setting extraction conditions (a filter) for each.

PRIOR ART REFERENCES

Patent References

[Patent Reference 1] Japanese Patent Application Publication No. 2015-109011

SUMMARY OF THE INVENTION

Problem to be Solved by the Invention

However, because the device information included in the history information and the device information included in the maintenance information are established beforehand, it might not be possible to output a display screen, a report, or the like corresponding to the device information included in the history information and the device information included in the maintenance information. Also, in order to output corresponding to the device information included in the history information and the device information included in the maintenance information, there have been cases in which it has been necessary to download each device information separately and performs margin processing with respect to the downloaded device information.

The present invention is made in consideration of the above-noted situation and has as an object to provide a device maintenance apparatus, a device maintenance method, a device maintenance program, and a recording medium capable of easy output of the desired device information.

Means for Solving the Problem (1) In some aspects, a device maintenance apparatus may include, but is not limited to, a display that displays a first screen generated based on a first device information of a maintenance-target device, a second screen generated based on a second device information of the device, and a third screen generated based on the first device information and the second device information.

(2) In some cases, in the device maintenance apparatus, the display may be be configured to display the first screen and the second screen transitionably.

(3) In some cases, in the device maintenance apparatus, the display may be configured to further display a selection screen for selecting device information to be displayed on the third screen from among at least either one of the first device information and the second device information.

(4) In some cases, in the device maintenance apparatus, the display may be configured to display the third screen on which each set of parameters of a respective one of the maintenance-target devices identified by different identifications is displayed, and wherein displayed positions of the sets of parameters are rearrangeable based on the different identifications over the third screen.

(5) In some cases, in the device maintenance apparatus, the display may be configured to display the third screen on which each set of parameters of a respective one of the maintenance-target devices identified by different maintenance items is displayed, and wherein displayed positions of the sets of parameters are rearrangeable based on the different maintenance items over the third screen.

(6) In some cases, in the device maintenance apparatus, the display may be configured to display on the first screen an operation history display screen that displays the operation history with respect to the device and displays on the second screen a maintenance information display screen that displays information regarding maintenance of the device.

(7) In some aspects, a device maintenance apparatus may include, but is not limited to, a display configured to display a first screen generated based on a first device information of a maintenance-target device and a second screen generated based on a second device information of the device; and a report generator configured to generate a report based on the first device information and the second device information.

(8) In some cases, in the device maintenance apparatus, the display may be configured to further display a selection screen for selecting information to be included in the report from among at least either one of the first device information and the second device information.

(9) In some cases, in the device maintenance apparatus, the report generator may be configured to generate the report in which each set of information of a respective one of the maintenance-target devices identified by different identifications is included, and wherein displayed positions of the sets of the information are rearrangeable based on the different identifications in the report.

(10) In some cases, in the device maintenance apparatus, the report generator may be configured to generate the report in which each set of information of a respective one of the maintenance-target devices identified by different maintenance items is included, and wherein displayed positions of the sets of the information are rearrangeable based on the different maintenance items in the report.

(11) In some cases, in the device maintenance apparatus, the display may be configured to display on the first screen an operation history display screen that displays the operation history with respect to the device and displays on the second screen a maintenance information display screen that displays information regarding maintenance of the device.

(12) In some aspects, a device maintenance method may include, but is not limited to, displaying a first screen generated based on a first device information of a maintenance-target device; displaying a second screen generated based on a second device information of the device; and displaying a third screen generated based on the first device information and the second device information.

(13) In some aspects, a device maintenance method may include, but is not limited to, displaying a first screen generated based on a first device information of a maintenance-target device; displaying a second screen generated based on a second device information of the device; and generating a report based on the first device information and the second device information.

(14) In some aspects, a recording medium that stores a computer program, when executed by a computer, to cause the computer to: display a first screen generated based on a first device information of a maintenance-target device; display a second screen generated based on a second device information of the device; and display a third screen generated based on the first device information and the second device information.

(15) In some aspects, a recording medium that stores a computer program, when executed by a computer, to cause the computer to: display a first screen generated based on a first device information of a maintenance-target device; display a second screen generated based on a second device information of the device; and generate a report based on the first device information and the second device information.

EFFECT OF THE INVENTION

According to the present invention a device maintenance apparatus, a device maintenance method, a device maintenance program, and a recording medium capable of easily outputting the desired device information can be provided.

BRIEF DESCRIPTIONS OF THE DRAWINGS

FIG. 2B is a block diagram showing an example of the functional constitution of a display data generator included in a device maintenance apparatus of FIG. 2A.

FIG. 5 shows an example of an operation history display screen displayed by a device maintenance apparatus in an embodiment.

FIG. 6 shows an example of search items in the operation history display displayed by a device maintenance apparatus in an embodiment.

FIG. 7 shows an example of a detailed display screen to which a transition is made from the operation history display screen displayed by a device maintenance apparatus in an embodiment.

FIG. 8 shows an example of a device maintenance information display screen displayed by a device maintenance apparatus in an embodiment.

FIG. 10 shows an example of a customized operation history display screen displayed by a device maintenance apparatus of an embodiment.

FIG. 11 shows an example of a customized operation history display sorted by device tags displayed by a device maintenance apparatus of an embodiment.

FIG. 12 shows an example of a customized operation history display sorted by maintenance items displayed by a device maintenance apparatus of an embodiment.

FIG. 13 shows an example of a report setting screen displayed by a device maintenance apparatus of an embodiment.

FIG. 14 shows an example of a report output by device maintenance apparatus of an embodiment.

EMBODIMENTS

A device maintenance apparatus, a device maintenance method, a device maintenance program, and a recording medium in an embodiment of the present invention will be described in detail below, with references made to the drawings.

Figure 1:
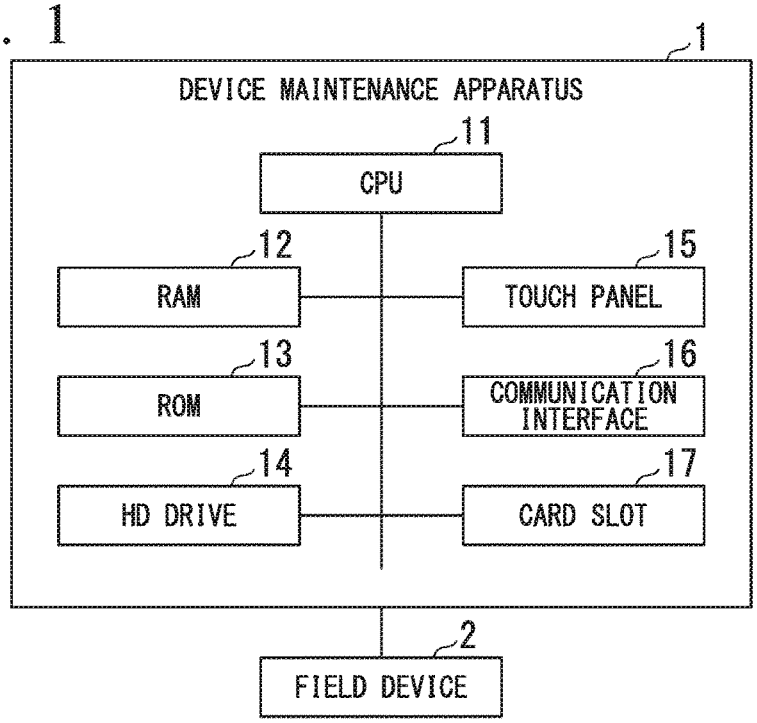
FIG. 1 is a block diagram showing an example of the hardware constitution of a device maintenance apparatus in an embodiment.

First the hardware constitution of the device maintenance apparatus shown in FIG. 1 will be described. FIG. 1 is a block diagram showing an example of the hardware constitution of a device maintenance apparatus 1 in the embodiment.

In FIG. 1, the device maintenance apparatus 1 has a CPU (central processing unit) 11, a RAM (random-access memory) 12, a ROM (read-only memory) 13, a HD (hard disk) drive 14, a touch panel 15, a communication interface 16, and a card slot 17. The device maintenance apparatus 1 is connected to a field device 2 to enable communication therewith.

The device maintenance apparatus 1 is a general-purpose device such as a laptop PC, a tablet PC, a PDA, or a smartphone, or a dedicated device maintenance apparatus. The device maintenance apparatus 1 supports field device maintenance tasks by executing a device maintenance program, including a device maintenance program for maintaining a field device. The device maintenance apparatus 1 is carried around within a plant by a worker performing maintenance tasks and is operated by the worker.

By executing a program stored in the RAM 12, the ROM 13, or HD drive 14, the CPU 11 controls the device maintenance apparatus 1. The device maintenance program, for example, is acquired from a recording medium in which the device maintenance program is recorded or from a server that provides the device maintenance program via a network, is installed on the HD drive 14, and read out and stored in the RAM 12 by the CPU 11.

The touch panel 15 has an operation/display function with an operation input function and a display function. The touch panel 15 displays information such as maintenance information regarding maintenance of a field device. The touch panel 15 enables a worker to make input of operations by using a fingertip, a touch pen, or the like. Although the device maintenance apparatus 1 in the present embodiment will be described for the case of using the touch panel 15 that has an operation/display function, the device maintenance apparatus 1 may have a display device that has a display function and an operation input device that has an operation input function, in which case, in the present embodiment, the display screen of the touch panel 15 can be implemented as a display screen of the display device, and operations of the touch panel 15 can be implemented as operations of the operation input device. The touch panel 15 may be implemented in a variety of forms, such as a head-mounted type, an eyeglass type, or a wristwatch type display.

The communication interface 16 is, for example, a network adapter that controls communications with a field device 2 or another device either via cable or wirelessly. Another device is, for example another device maintenance apparatus, a maintenance information management server, a DCS (distributed control system) controller, a factory automation computer, or a programmable logic controller (PLC), which are not illustrated.

The communication interface 16 controls communication with the field device 2 using a communication protocol that can be used in the field device 2. Various communication protocols are used in various field devices 2 used in a plant. The communication interface 16, therefore, controls communication with the field devices 2 by specific communication protocols handling the field devices 2. For example, the communication interface 16 controls communication with a field device 2 that uses the ISA (International Society of Automation) wireless communication standard ISA100 as the communication type. The communication interface 16 may control communication with a field device 2 using the industrial instrumentation dedicated communication types such as HART (Highway Addressable Remote Transducer) (registered trademark), BRAIN (registered trademark), FOUNDATION Fieldbus, or PROFIBUS. The communication interface 16 may control communication with a field device 2 or a distributed control system or the like that uses a general type of communication such as wireless LAN communication, cable LAN communication, infrared communication, or near-field wireless communication.

The card slot 17 is for insertion of a PC card. The card slot 17 enables the use of the functions of a PC card inserted into the device maintenance apparatus 1. A PC card can, for example, provide a communication function that implements specific communication or a storage function.

A field device 2 that is connected to the device maintenance apparatus 1 to enable communication therewith is, for example, an input device that inputs a signal of a physical quantity (pressure, temperature, or the like) to the device maintenance apparatus 1, such as a differential pressure gauge, a temperature gauge, or a flow gauge or an output device that outputs a control signal from the device maintenance apparatus 1 that changes the opening of an adjustment valve. Although FIG. 1 shows just one field device 2, as noted above various field devices 2 are used in a plant and the device maintenance apparatus 1 is connected to a plurality of field devices 2.

The above completes the description of the hardware constitution of the device maintenance apparatus 1 using FIG. 1.

The functional constitution of the device maintenance apparatus will now be described, using FIG. 2. FIG. 2 is a block diagram showing an example of the functional constitution of a device maintenance apparatus 100 of the embodiment. In the description to follow, references will be made to FIG. 1 as appropriate.

Figure 2A:
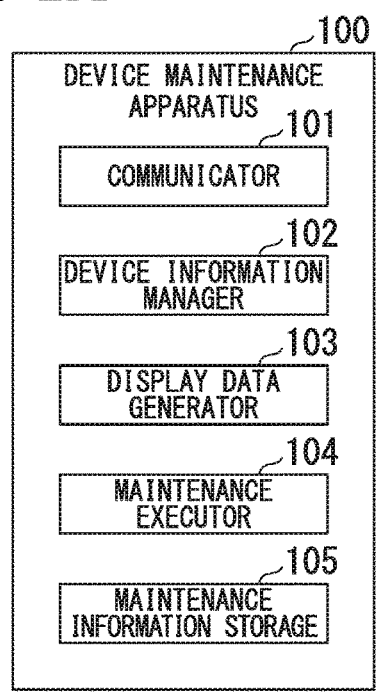
FIG. 2A is a block diagram showing an example of the functional constitution of a device maintenance apparatus of an embodiment.

In FIG. 2A, the device maintenance apparatus 100 has the functions of a communicator 101, a device information storage 102, a display data generator 103, a maintenance executor 104, and a maintenance information storage 105. The above-noted functions of the device maintenance apparatus 100 can be implemented by the CPU 11 shown in FIG. 1 executing a program. That is, the above-noted functions of the device maintenance apparatus 100 are functional modules implemented by software.

The communicator 101 controls communication with the field device 2 or other devices, via the communication interface 16 and acquires parameters of the field device 2. A parameter of the field device 2 is an example of device information of the field device 2 and, in the present embodiment, the description will treat the device information and the parameter as having the same meaning.

The parameter of the field device 2, for example, is information that identifies the field device 2, such as the field device 2 device tag, device address, manufacturer, device ID or device type, model name, and communication standard, setting values for establishing the operation of the field device 2, information indicating the state of the field device 2, or values measured by the field device 2. That is, parameters may include both fixed values such as the device ID and variable values such as the field device setting values and measured values. A parameter of the field device 2 may be either information acquired from the field device 2 or information that is set or input at the device maintenance apparatus 100. Information set or input at the device maintenance apparatus 100 can include, for example, text data, such as notes left by a worker, or image data such as a photograph (still photograph) or video captured by a worker.

The communicator 101 performs parameter settings, read-out, and verification of a field device 2, depending upon the type of communication (standard of communication) controlled by the communicator 101, such as ISA 100, HART, or BRAIN. The communicator 101 may control communication such as by wireless LAN, cable LAN, infrared, or near-field wireless communication. The communicator 101 may have program modules for performing control to handle communication of each type. The communicator 101 may be such that it enables additional installation of a program module required for each of the communication types. The communicator 101 can automatically (or manually) recognize a field device 2 connected thereto via the communication interface 16 and acquire the parameters of the recognized field device 2.

The acquisition of parameters of the field device 2 is not restricted to acquiring information by the above-noted communication. For example, a worker might visually verify the tag name or model name of a field device 2 and make key input, or might use a camera provided in the device maintenance apparatus 1 to photograph the name plate of a field device 2 that notes the tag name or model name and recognize the tag name or model name from the captured image to acquire these from the field device 2.

The timing of acquisition of parameters of the field device 2 is arbitrary. For example, the acquisition of parameters is done irregularly, by a worker performing maintenance items. The parameter acquisition might also be done periodically, at a period (frequency) pre-established in accordance with the type of field device 2, such as the class of the field device 2 or type of communication.

The device information storage 102 has a database function that stores field device 2 device information (parameters) and corresponding maintenance item information. The maintenance items stored in the device information storage 102 are verification of the parameters set in the field devices 2, settings of parameters with respect to the field devices 2, prescribed tests, and prescribed adjustments and the like. The maintenance items may include output of a report for reporting the result of executing maintenance items. In the present embodiment, the maintenance items stored by the device information storage 102 are, for example, a loop test, a zero-point adjustment, a span adjustment, a quick report, display of detailed diagnosis information, tag/address/roll setting, setting/release of setting limits, DTM (device type manager) installation, DD (device description) installation, parameter acquisition, valve calibration, device squawk, ISA100 provisioning, device on-service/off-service switching, service mode switching, valve partial stroke test (partial actuation test).

The device information storage 102 associates each field device 2 with the maintenance items to be executed in the field devices 2 and stores the associated information to enable read-out thereof. The device information storage 102 can associate one or a plurality of maintenance items with one field device 2. Of the maintenance items, there are some maintenance items that can be executed by the prescribed field device 2 and some maintenance items that cannot. For example, a valve calibration maintenance item can be executed by a field device 2 that has a valve, but cannot be executed by a field device 2 such as a temperature gauge that does not have a valve. The device information storage 102 stores the maintenance items that can be executed by each of the field devices 2, in association with the field devices 2. The association of the field device 2 parameters and the maintenance items can, for example, be made based on a setting file into which the correspondence has been set beforehand. The setting file, for example, may associate information of the device type and communication type with the maintenance items. The association of the field devices 2 with the maintenance items may be arbitrarily set by a worker.

In a field device 2, there may be a case in which maintenance items are not associated (that is, in which zero maintenance items are associated). For example, with respect to a field device 2 that has failed or a field device 2 that is not in use, by storing that no maintenance items are associated, it is possible to indicate that maintenance work is not required. The device information storage 102 may store the associated information in, for example, the HD drive 14.

The device information storage 102 stores parameters acquired from field devices in the past. The parameters of field devices 2 might differ, depending upon the type of field device 2. For example, the parameter contents will differ between the case in which the type of the field device 2 is an input device such as a pressure difference gauge and the case in which it is an output device such as a valve. The parameters of the field device 2 might also differ for each type of communication performed thereby. For example, the parameters of the field device 2 will differ between the case of using the ISA100 and the case of using HART as the communication type. That is, the device information storage 102 can store parameters having contents that differ for each field device 2 and are acquired at different times for each field device 2.

The display data generator 103 generates display data to be displayed on the touch panel 15. The display data generator 103 of the present embodiment has the functions shown in FIG. 2B. In FIG. 2B, the display data generator 103 has the functions of a main screen generator 201, a sub screen generator 202, a customized screen generator 203, and a report generator 204.

The main screen generator 201 generates the main screen displayed on the touch panel 15. The main screen is for maintenance work and is displayed first after the device maintenance apparatus 1 is started. The main screen, for example, is displayed after the startup screen or log-in screen for log-in processing displayed at the very first after the device maintenance apparatus 1 is started. In the present embodiment, the main screens are three display screens, the segment viewer, the device navigator, and the operation log, which will be described later. The segment viewer is a display screen that displays a list of actual devices in the same segment of HART, FOUNDATION Fieldbus, BRAIN, or ISA100 connected to the device maintenance apparatus 1. The device navigator is a display screen that displays a list of devices registered in the device information storage 102. The operation log is a display screen that displays an operation log list in the device maintenance apparatus 1. The device maintenance apparatus 1, by displaying each of these main screens on the touch panel 15, enables efficient maintenance work regarding each of the main screens. The three display screens (segment viewer, the device navigator, and the operation log) are switched by a switching button.

A sub screen generator 202 generates a sub screen displayed on the touch panel 15. The sub screen is a screen that might be transitioned to (sometimes referred to as being 'called' or 'progressing') from main screen, and displays information regarding the content of the main screen. The sub screen, for example, is a "Device Viewer" that is a display screen for verifying the detailed operation or failure status of a HART, or a FOUNDATION Fieldbus device. The sub screen also displays the device DTM (DTM Works) of a HART, a FGOUNDATION Fieldbus, a BRAIN, or an ISA100 device. The sub screen may be, for example, "Parameter Manager" for mainly exchanging devices with respect to HART and FOUNDATION Fieldbus devices, a "DD Menu" for setting and adjusting a FOUNDATION Fieldbus device, or "device maintenance information" for storing maintenance information of the devices in a database.

Transitioning to each of the sub screens may be made possible from a plurality of main screens. For example, by making the device maintenance information sub screen reachable by transitioning from the segment viewer, the device navigator, or the operation log main screen, device maintenance instruction can be referred to from each of the main screens. Because the device viewer for verifying the detailed operating state of devices and the DD Menu for making settings and adjustments of devices need only provide displays for connected field devices, it is sufficient to be able to transition from the segment viewer main screen. By enabling transition between main screens and sub screens, it is possible to provide a hierarchy to the parameters of field devices displayed on the touch panel 15 and change the detail (granularity) of parameters in accordance with the hierarchal level.

The customized screen generator 203 generates a customized screen, based on the parameters to be displayed on the main screen and the parameters to be displayed on the sub screens. A customized screen is a display screen that displays the parameters that is combined the parameters displayed on the main screen with the parameters displayed on the sub screen.

In the present embodiment, the main screen that is shown as the "first screen" generated based on information (including an information group) displayed on the main screen that is shown as the "first device information." The sub screen shown as the "second screen" is generated based on the information displayed on the sub screen shown as the "second device information." Additionally, the customized screen shown as the "third screen" is generated based on the first device information and the second device information. As described above, the first device information and the second device information are hierarchically associated by the granularity of the parameter information, and it is not possible to simultaneously display on the touch panel 15 or output the same report of the first device information and the second device information. The customized screen generator 203, by generating data that combines the first device information and the second device information, can display the first device information and the second device information on the touch panel 15 simultaneously.

The customized screen generator 203 can rearrange displaying positions of plural sets of parameters on the customized screen, wherein the plural sets of parameters are sorted by the prescribed information. The prescribed information is, for example, identification such as a tag ID for identifying the field device 2. The prescribed information is also the maintenance items of the field device 2. By, for example, sorting by the tag ID or maintenance item, visual verification of the displayed parameters is facilitated.

The selector 2031 generates a selection screen for selecting the first device information and the second device information. The customized screen generator 203 generates the customized screen based on information selected in the selection screen. The selection screen generated by the selector 2031 will be described in detail later, using FIG. 9.

The report generator 204 generates a report, based on parameters displayed in the main screen and parameters displayed in the sub screen. The report is data in a prescribed format, created by a combination of parameters displayed on the main screen and parameters displayed on the sub screen. Report generation may include, for example, generation of data in a prescribed format, printing of the generated data, or output of the generated data to outside the device maintenance apparatus 100.

The report generator 204 can rearrange displaying positions of plural sets of parameters on the report, wherein the plural sets of parameters are sorted by the prescribed information. The prescribed information is, for example identification such as a tag ID for identifying the field device 2. The prescribed information is also the maintenance items of the field device 2. By, for example, sorting by the tag ID or maintenance item, visual verification of the displayed parameters is facilitated.

The selector 2041 generates a selection screen for selecting a combination of the first device information and the second device information. The report generator 204 generates the report based on information selected in the selection screen. The selection screen will be described in detail later, using FIG. 12.

In FIG. 2, the description is of the case in which the functions of the communicator 101, the device information storage 102, the display data generator 103, the maintenance executor 104, and the maintenance information storage 105 of the device maintenance apparatus 100 are implemented by software. However, one or more of the above-noted functions of the device maintenance apparatus 100 may be implemented by hardware. Of the above-noted functions of the device maintenance apparatus 100, one function may be divided into a plurality of functions, and two or more functions thereof may be combined into one function.

The above completes the description of the functional constitution of the device maintenance apparatus using FIG. 2.

Figure 3:
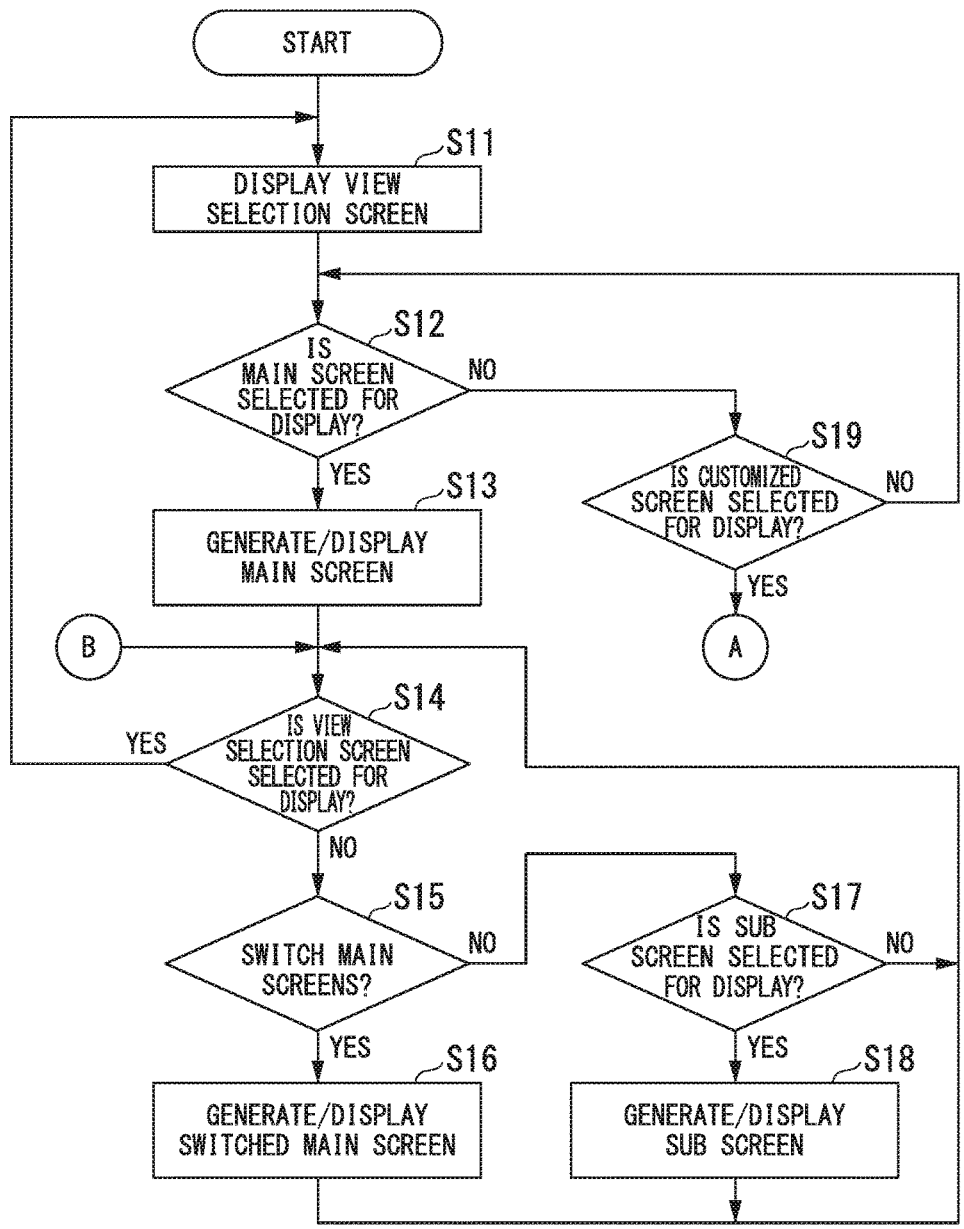
FIG. 3 is a flowchart showing an example of a view selection processing in device maintenance apparatus in an embodiment.
Figure 4:
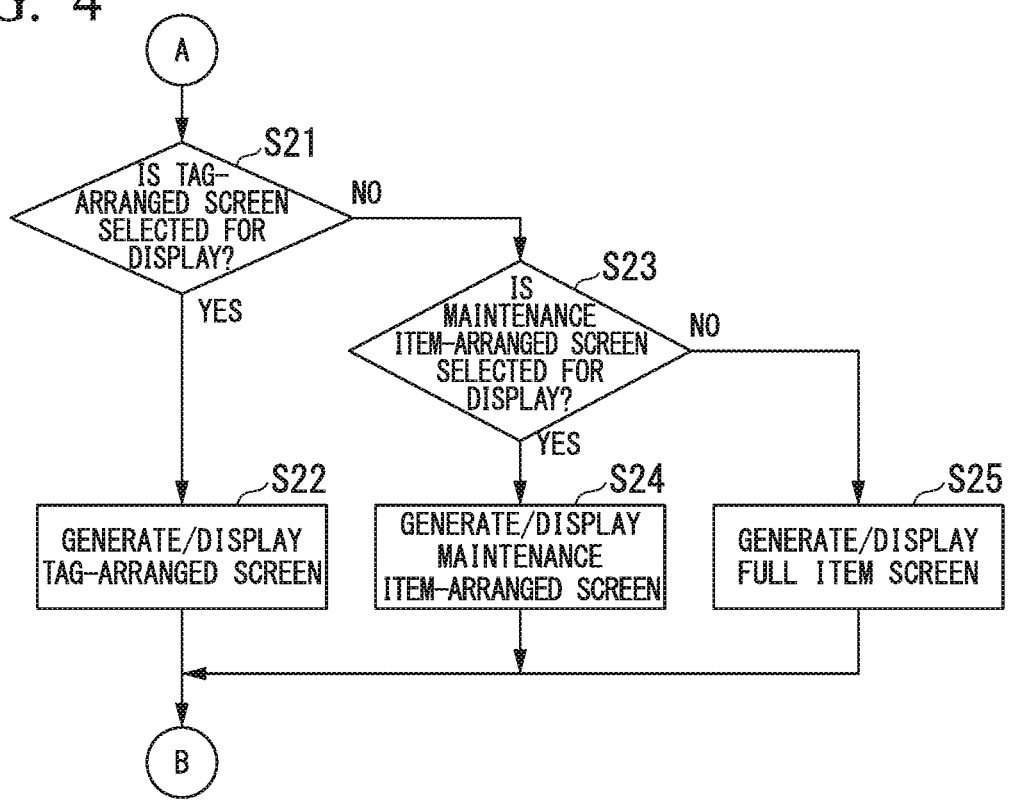
FIG. 4 is a flowchart showing an example of a view selection processing in device maintenance apparatus in an embodiment.

Next, using FIG. 3 and FIG. 4, the view selection processing will be described. FIG. 3 and FIG. 4 are flowcharts that show an example of the view selection processing in the device maintenance apparatus of the embodiment. The processing in the device maintenance apparatus 100 described in FIG. 3 and FIG. 4 can be, for example, executed by the CPU 11 executing the functions described in FIG. 2. In the following description, reference will be made to FIG. 1 and FIG. 2 as appropriate.

In FIG. 3, the device maintenance apparatus 100 displays a view selection screen (step S11). A view is a display screen displayed on the touch panel 15. The view selection screen is a screen for selecting either the main screen or a customized screen as the display screen displayed on the touch panel 15. The view selection screen displays, for example, buttons for selecting the main screen or the customized screen.

After executing the processing of step S11, the device maintenance apparatus 100 determines whether or not the main screen has been selected (step S12). If the determination is that the main screen has been selected (YES at step S12), the device maintenance apparatus 100 generates and displays the main screen on the touch panel 15 (step S13). The main screen displayed at step S13 may be the segment viewer, the device navigator, or the operation log main screen. The device maintenance apparatus 100, for example, may store the main screen displayed last before executing the processing of step S13 and display the stored main screen.

After executing the processing of step S13, the device maintenance apparatus 100 determines whether or not to the view is to be selected (step S14). Whether or not the view is to be selected is determined, for example, by whether or not a button for view selection displayed on the touch panel 15 has been pressed. If the determination has been that the view selection is to be done (YES at step S14), the device maintenance apparatus 100 executes the processing of step S11 and displays the view selection screen again.

If, however, the determination has been that the view selection is not to be done (NO at step S14), the device maintenance apparatus 100 determines whether or not to switch the main screen (step S15). Whether or not to switch to the main screen is determined, for example, by whether or not a button for switching the main screen, to be described later in FIG. 5 and the like, has been pressed. If the determination is that the main screen is to be switched (YES at step S15), the device maintenance apparatus 100 switches the main screen by generating and displaying the main screen in accordance with the pressing of the button to switch the main screen (step S16).

If, however, the determination is that the main screen is not to be switched (NO at step S15), the device maintenance apparatus 100 determines whether or not to display the sub screen (step S17). Whether or not to display the sub screen is determined, for example, by whether or not a button for displaying the sub screen displayed on the touch panel 15 has been pressed. If the determination is that the sub screen is to be displayed (YES at step S17), the device maintenance apparatus 100 generates and displays the sub screen on the touch panel 15 (transitioning to the sub screen) (step S18). The transition from the main screen to the sub screen can be made, as described above, from a specific main screen to a specific sub screen. The buttons for displaying the sub screen to which transitioning is not possible may be displayed grayed-out, so that they cannot be pressed. In the processing of step S15 and step S17, the device maintenance apparatus 100 may display the main screens and the sub screens so that transitioning is possible.

If the sub screen is not to be displayed (NO at step S17), after executing the processing of step S16 or executing the processing of step S18, the device maintenance apparatus 100 executes the processing of step S14 again. In the processing of step S14 to step S18, the device maintenance apparatus 100 makes a switched display of the main screen and the sub screen until returning to the view selection processing (until the result at step S14 is YES).

In the processing of step S12, if the determination is that a main screen is not selected (NO at step S12), the device maintenance apparatus 100 determines whether or not a customized screen is selected (step S19). If the determination is that a customized screen is not selected (NO at step S19), the device maintenance apparatus 100 executes the processing of step S12 again and determines whether or not a main screen has been selected. If, however, the determination is that a customized screen has been selected (YES at step S19), the device maintenance apparatus 100 executes the processing of the flowchart of FIG. 4, shown by the node point A.

In FIG. 4, the device maintenance apparatus 100 determines whether or not a tag display has been selected (step S21). A tag display is a customized screen in which the parameter display is arranged (sorted, for example) by the tag ID. Whether or not the tag display has been selected can be determined, for example, by whether or not a radio button displayed on the touch panel 15 for making a tag display has been pressed. If the determination is that the tag display has been selected (YES at step S21), the device maintenance apparatus 100 generates and displays on the touch panel 15 a display screen in which the parameter display is arranged by tag IDs (step S22). An example of a customized screen displayed at step S22 will be described later, using FIG. 11.

If, however, the determination is that the tag display has not been selected (No at step S21), the device maintenance apparatus 100 determines whether or not the maintenance item display has been selected (step S23). The maintenance item display is a customized screen in which the parameter display is arranged by maintenance items. Whether or not the maintenance item display has been selected can be determined by whether or not a radio button displayed on the touch panel 15 for making the maintenance item display has been pressed. If the determination is that the maintenance item display has been selected (YES at step S23), the device maintenance apparatus 100 generates and displays on the touch panel 15 a display screen in which the parameter display in the customized display is arranged by maintenance items (step S24). An example of the customized screen displayed at step S24 will be described later, using FIG. 12.

If, however, the determination is that a maintenance item display has not been selected (NO at step S23), the device maintenance apparatus 100 generates a display screen that displays the entire history of the parameter display in the customized display (not sorted or the like) and displays it on the touch panel 15 (step S25). An example of the customized screen displayed at step S25 will be described later, using FIG. 10.

After executing the processing of step S22, after executing the processing of step S24, and after executing the processing of step S25, the device maintenance apparatus 100 executes the processing of step S14 in FIG. 3, shown by the node point B.

In the present embodiment, although the parameter display in a customized screen arranged by tag IDs or maintenance items is shown for the case of sorting the parameter display, the arrangement of parameter is not restricted to sorting. For example, this can be filtering and disposition of only parameters having a specified tag ID or maintenance item.

In the present embodiment, so that a customized screen with parameters arranged by tag IDs or maintenance items is not displayed, a plus sign (+) button or the like can be pressed for each tag ID or maintenance item or for all thereof so as to expand the parameters.

In the present embodiment, although the example shown is that in which the parameter display in a customized screen is arranged by tag ID or maintenance item, the parameter display arrangement is not restricted to this. For example, the customized display of parameters may be arranged by some other parameter item.

Although in FIG. 3 and FIG. 4 the processing for generation and display of a customized screen that displays on the touch panel 15, the processing in FIG. 3 and FIG. 4 may be applied in the case of generating and outputting a report that has been customized, which will be described later. That is, if a customized report is generated and output, rather than generating a display screen for display on the touch panel 15, report data is generated and output. An example of the output customized report will be described later, using FIG. 14.

Also, although FIG. 3 shows the case in which, in step S15 to step S18 there is direct transition between the main screen and the sub screen, transitioning between the main screen and the sub screen may be done, for example, via another display screen that is not the main screen or the sub screen.

The execution sequence and timing of the processing of step S16 that displays a main screen with the first screen as an example, the processing of step S18 that displays the sub screen with the second screen as an example, the processing of step S22, the processing of step S24, and the processing of step S25 that display a customized screen with the third screen as an example are not fixed, and these may be executed with an arbitrary sequence and timing. That is, the first screen display step that displays the first screen generated based on the first device information of the maintenance-target device, the second screen display step that displays the second screen generated based on the second device information of the maintenance-target device, and the third screen display step that display the third screen generated based on the first device information and the second device information can be executed with an arbitrary sequence and timing.

In the same manner, in the case of generating and outputting report data rather than generating a display screen for display on the touch panel 15, the execution sequence and timing of the processing that displays the first screen, the processing that displays the second screen, and the processing that generates the report is not fixed, and these may be executed with an arbitrary sequence and timing. That is, the first screen display step that displays the first screen that is generated based on the first device information of the maintenance-target device, the second screen display step that displays the second screen that is generated based on the second device information of the device, and the report generation step that generates the report based on the first device information and the second device information may be executed with an arbitrary sequence and timing.

The above completes the description of the view selection processing using FIG. 3 and FIG. 4.

Next, the operation history display screen, which is an example of a main screen generated and displayed at step S13 and step S16 in FIG. 3, will be described, using FIG. 5. FIG. 5 shows an example of an operation history display screen displayed by a device maintenance apparatus in the embodiment.

In FIG. 5, the main screen 1000 has a menu bar 1001, a segment viewer switching button 1002, a device navigator switching button 1003, an operation log switching button 1004, an operation history display 1011, a displayed period specifier 1012, and a filter specifying button 1013.

The menu bar 1001 has the major menu items File (F), View (V), Action (A), Tools (T), and Help (H). The characters in parentheses are shortcut keys that, when pressed together with a specified key, operate the menu bar. When a major menu item is selected, further selection is possible of a detailed menu item from a pull-down menu. In the present embodiment, because the function when a menu item in the menu bar 1001 is operated is the same as when a button is pressed, the operation of the menu bar 1001 will be taken to be an example of pressing a button.

The segment viewer switching button 1002 is a button for switching the main screen to the segment viewer. The device navigator switching button 1003 is a button for switching the main screen to the device navigator. The operation log switching button 1004 is a button for switching the main screen to the operation log.

The operation history display 1011 displays an operation log with respect to a field device 2. The operation history display 1011, in the display items Device, Source, Date/Time, User, and Message, displays in one line one operation with respect to the field device 2, enabling visual verification of the operation history in time sequence. The sub screen that shows the details of each operation can be displayed by pressing the black, down-pointing triangle button that is illustrated.

The displayed period specifier 1012 displays a filter specification for applying a filter as a time period with respect to the operation log displayed in the operation history display 1011. If the radio button All Days is selected, all of the recorded operation logs are displayed in the operation history display 1011. If the radio button Specify Date is selected, the operation log of the date specified in the calendar is displayed in the operation history display 1011. If the radio button Specify Time Period is selected, the operation log for the time period specified by the starting day and the ending day is displayed in the operation history display 1011.

The filter specifying button 1013 is a button for setting a filter other than the displayed period. By pressing the filter specifying button 1013 a filter can be selected with respect to the operation log displayed in the operation history display 1011. Details of the filtering with respect to the operation log displayed in the operation history display 1011 will be described later, using FIG. 6.

The above completes the description of the operation history display screen using FIG. 5.

Next, using FIG. 6, the filtering with respect to the operation log described by FIG. 5 will be described. FIG. 6 shows examples of search items in the operation history display displayed by the device maintenance apparatus in the embodiment.

In FIG. 6, Items shows examples of search items as filters with respect to the operation log. Because Displayed Period is the filter by the displayed period specifier 1012 described in FIG. 5, its description will be omitted. Filter indicates filters that can be specified when the filter specifying button 1013 is pressed. All Days indicates that a display without specifying filtering is possible. Device Tag indicates that display of the operation log by specifying the device tag is possible. Category indicates that display of the operation log by specifying the operation category is possible. Setting, Inspection, Maintenance Management, System, and PRM (parameter management) can be specified as the operation category. Because the filters shown in FIG. 6 are filters with respect to the display in the operation history display 1011, display by searching on a parameter included in the sub screen is not possible. Searching of sub screens is done by using the customized screen to be described later.

The above completes the description of filtering with respect to the operation log using FIG. 6.

Figure 7:
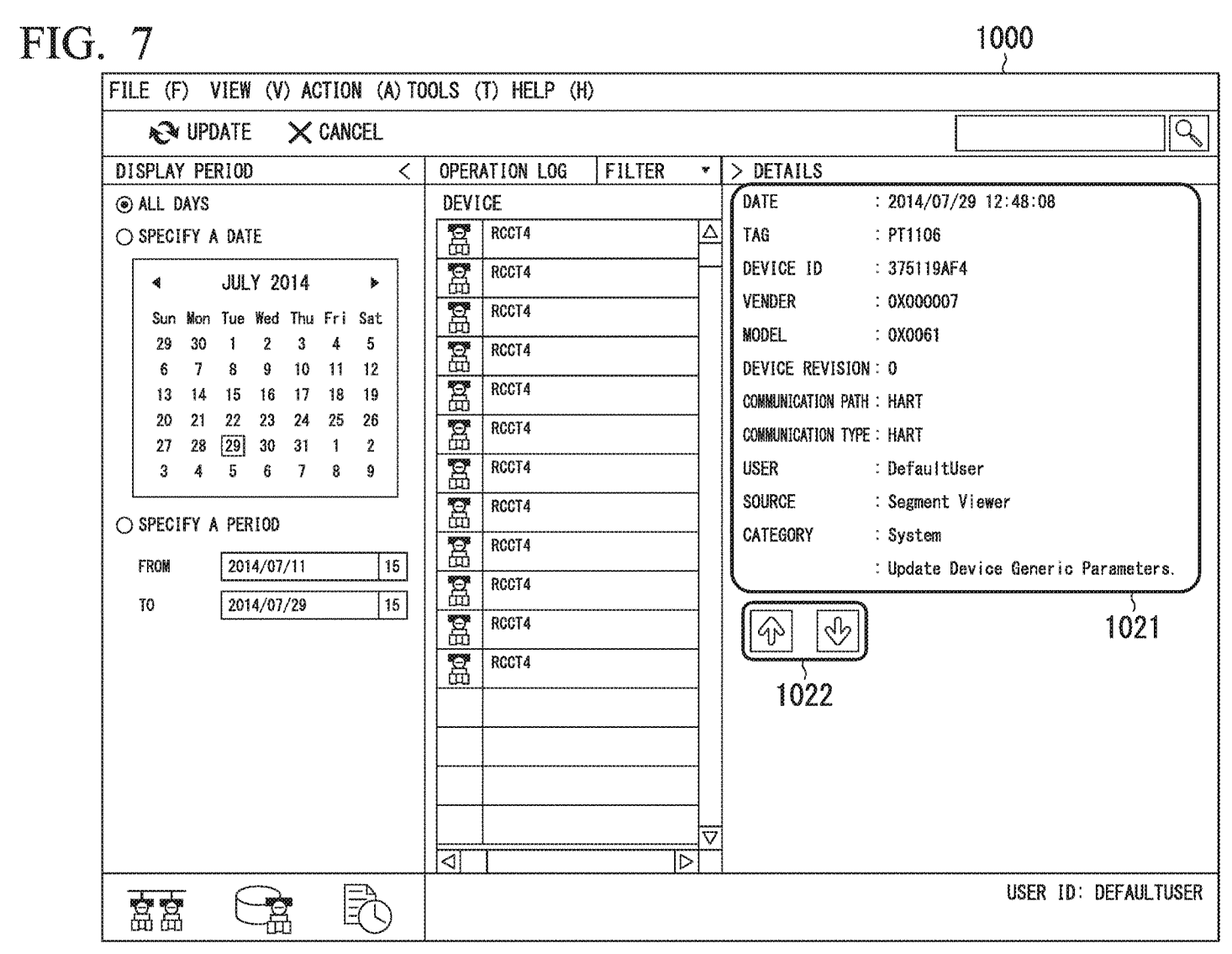

Next, using FIG. 7, the detailed display screen transitioned to from the operation history display screen will be described. FIG. 7 shows an example of a detailed display screen transitioned to from an operation history display screen displayed on the device maintenance apparatus in the present embodiment.

In FIG. 7 the main screen 1000 has the device information 1021 that indicates basic information of a device from among the maintenance information, which is the sub screen, and a display switcher 1022. The device information 1021 is the sub screen displayed when the down-pointing triangle button at sub field devices 2 in the operation history display 1011 of the main screen described by FIG. 5 is pressed. The device information 1021 includes detailed parameters regarding basic information of the field devices. FIG. 7 shows that the device information 1021 regarding the field device 2 illustrated at the very top is displayed. By pressing the up button or the down button of the display switcher 1022, the field device 2 displayed in the device information 1021 can be switched. By switching the display between the main screen and the sub screen shown in FIG. 5 and FIG. 7, it is possible to switch type of parameters to be displayed.

The above completes the description of detailed display screen transitioned to from the operation history display screen using FIG. 7.

Next, the device maintenance information display screen will be described, using FIG. 8. FIG. 8 shows an example of a device maintenance information display screen displayed by the device maintenance apparatus in the embodiment.

In FIG. 8, the device maintenance information 2000 displays the maintenance information of a specific field device 2. The maintenance information shown in FIG. 8, in addition to the basic information of the field device in FIG. 7, has sticky note information, image, operation log, and parameter (setting value), and attached file display screens. The device maintenance information 2000 has history information regarding the execution of maintenance items.

The information of the sticky note, image, operation log, parameter (setting value), and attached file shown in FIG. 8 are detailed information that is not displayed in the operation history display 1011 shown in FIG. 5 or the device information 1021 shown in FIG. 7. The device maintenance apparatus 100 in the present embodiment, in addition to being able to display the general operation history in time sequence in a plurality of field devices in the operation history display screen shown in FIG. 5, can display detailed maintenance information for each device in the device maintenance information shown in FIG. 8. That is, in the present embodiment, by switching the hierarchal level (between main screen and sub screen) of the display screen, the hierarchal level of the displayed parameters (general or detailed) can be switched.

The above completes the description of the device maintenance information display screen, using FIG. 8.

Figure 9:
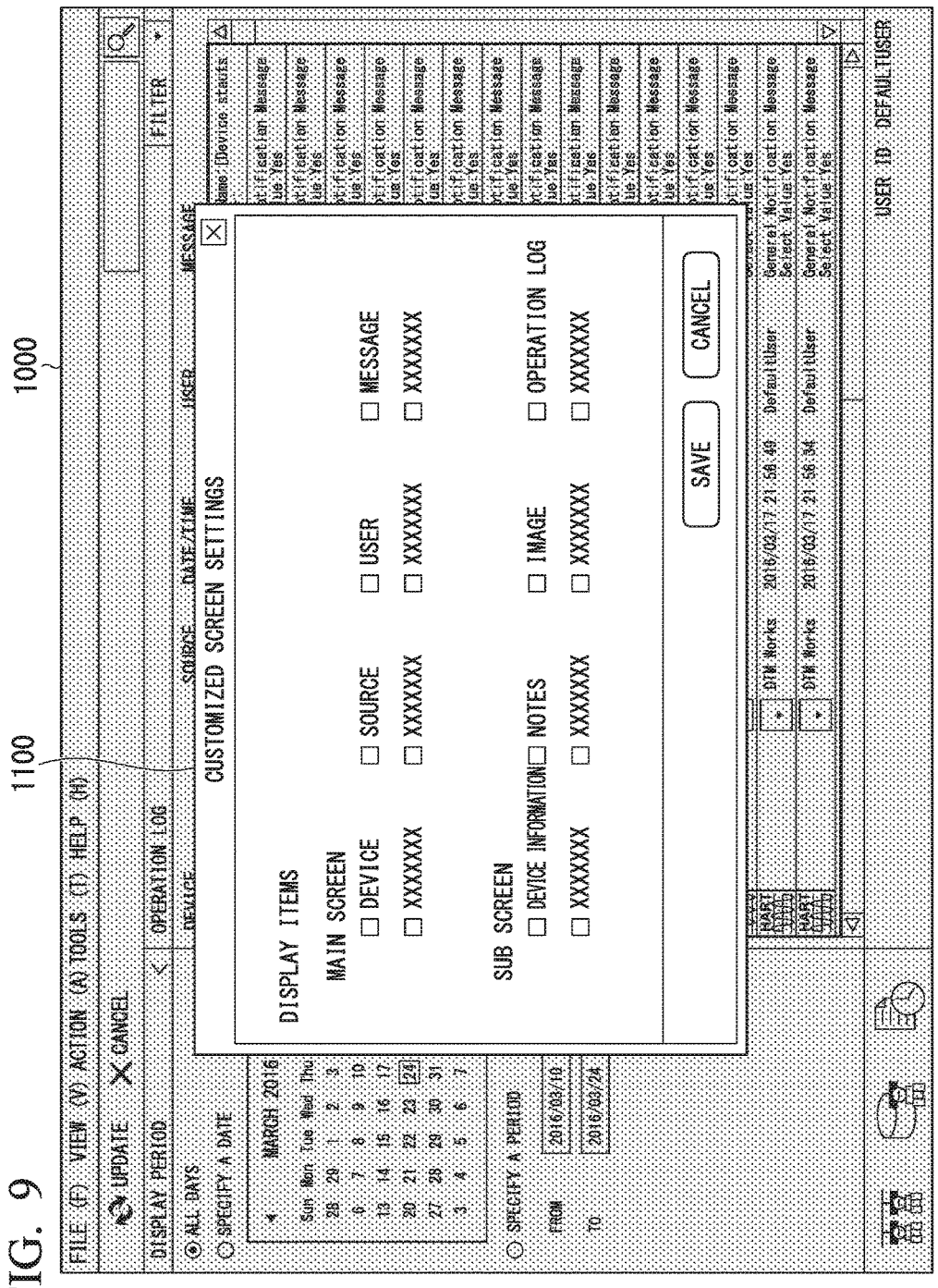
FIG. 9 shows an example of a customized screen setting screen displayed by a device maintenance apparatus in an embodiment.

Next, the customized screen setting screen will be described, using FIG. 9. FIG. 9 shows an example of the customized screen setting screen displayed by the device maintenance apparatus in the embodiment.

In FIG. 9, a customized screen setting screen 1100 is displayed overlaid on the main screen 1000. The customized screen setting screen 1100 is for setting items of parameters displayed on a customized screen. The customized screen setting screen 1100 has checkboxes for selecting parameters (first device information) of a main screen shown by the example of the first screen and checkboxes for selecting parameters (second device information) of the sub screen shown by the example of the second screen. The parameters of the main screen include the display items of Device, Source, Date/Time, User, Message, and the like described in FIG. 5. The parameters of the sub screen include the display items Device Information, Sticky Note, Image, Operation Log, and the like described in FIG. 8. In the customized screen setting screen 1110 at least one of the main screen parameters and sub screen parameters is selected. The selected parameter is displayed on the customized screen shown as the third screen. The third screen displays each set of parameters of a respective one of the maintenance-target devices identified by different identifications. The displayed positions of the sets of parameters are rearrangeable based on the different identifications over the third screen.

The above completes the description of the customized screen setting screen, using FIG. 9.

Next, using FIG. 10, the customized operation history display screen will be described. FIG. 10 shows an example of a customized operation history display screen displayed by the device maintenance apparatus in the embodiment.

In FIG. 10, the customized screen 3000 has sort specifying buttons 3011, an operation history display 3021, and sticky note information 3022. The sort specifying buttons 3011 are radio buttons that specify the method of sorting the operation history display 3021 to be displayed. The sort specifying buttons 3011 include specification of Date and Time, Device Tag, and Input Loop Check. Date and Time is specified when sorting is not to be done. Device Tag is specified when the parameters of the operation history display 3021 are to be sorted by the tag IDs. Input Loop Check is specified when the parameters of the operation history display 3021 are to be sorted by a loop check, which is one maintenance item. FIG. 10 shows that the Date and Time of the sort specifying buttons 3011 is selected.

The operation history display 3021 and the sticky note information 3022 display parameters selected in the customized screen setting screen 1100 described in FIG. 9. The operation history display 3021 shows the example in which parameters such as Device of FIG. 5 are shown by English-language representation such as "Device" as opposed to Japanese-language. The display data generator 103 of the device maintenance apparatus 100 can change the display language by selection of prescribed languages. The parameters displayed in the operation history display 3021 are selected from the first device information, and the sticky note information 3022 is selected from the second device information. A least one parameter selected from the first device information and the second device information is displayed in the customized screen 3000.

The sticky note information 3022 is an example of detailed maintenance information that is not displayed in the operation history display 1011 shown in FIG. 5. That is, both the information displayed in the main screen (the first device information) and the information displayed in the sub screen (the second device information) can be specified for inclusion in the customized screen 3000. By displaying a display screen that includes both the first device information and the second device information, the customized screen 3000 can display both types of information, without switching to transition between the display screens. This enables easy display of the desired device information.

Although FIG. 10 shows the case in which the sticky note information 3022 is displayed as the second device information in the customized screen 3000, the second device information displayed in the customized screen is not restricted to this. For example, information such as an image or an operation log may be displayed in the customized screen.

The above completes the description of the customized operation history display using FIG. 10.

Figure 11:
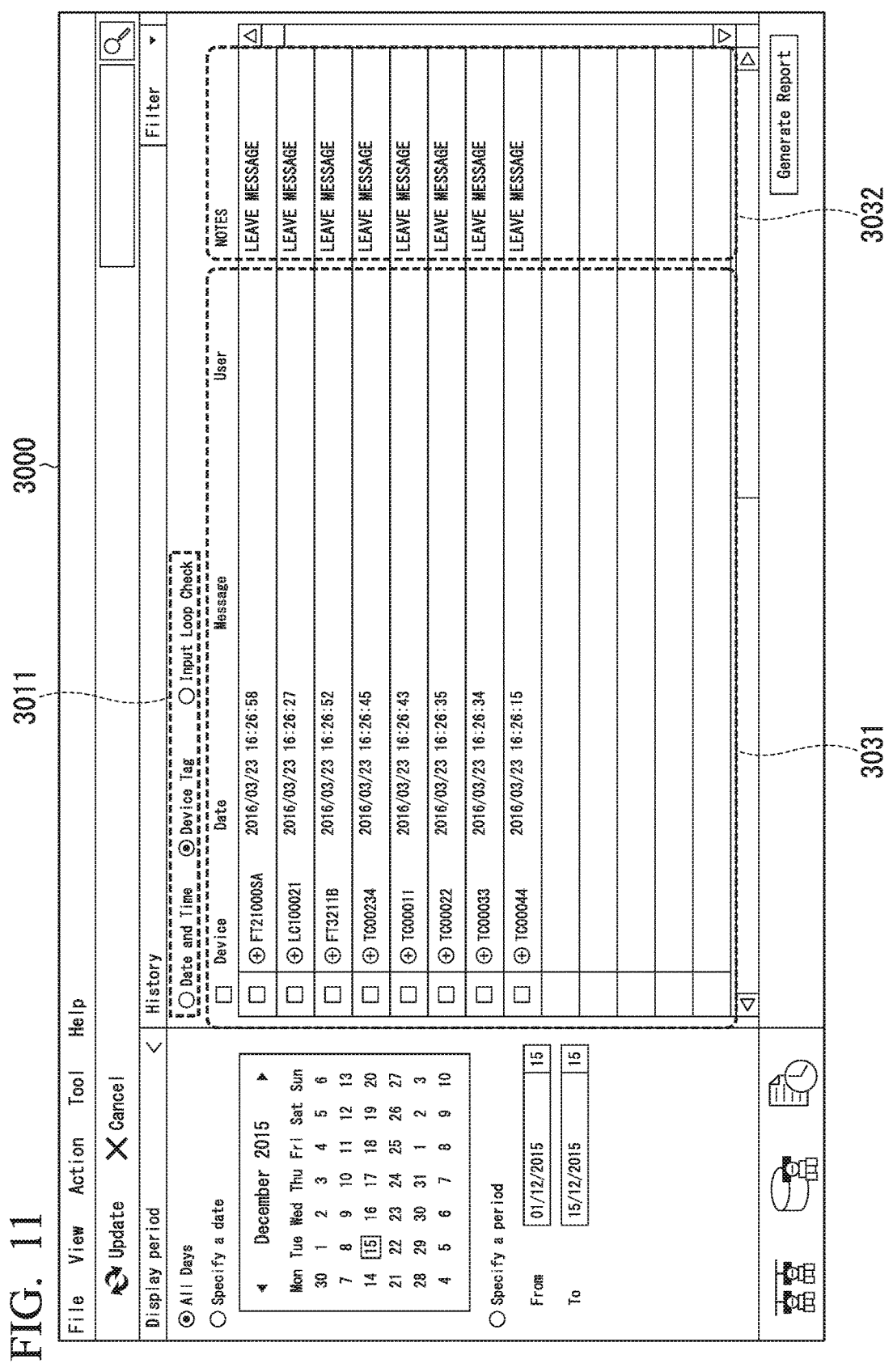

Next, using FIG. 11, the customized screen in which the operation history display is sorted by device tags will be described. FIG. 11 shows an example of a customized screen displayed by the device maintenance apparatus in the embodiment in which the operation history display is sorted by device tags.

In FIG. 11, the customized screen 3000 has sort specifying buttons 3011, an operation history display 3031, and sticky note information 3032. FIG. 11 shows that Device Tag of the sort specifying buttons 3011 is selected. The operation history display 3031 displays the operation history for each device tag together. By pressing a plus sign (+) button in the operation history display 3031, the operation history of the sub device tag is displayed in expanded form. By selecting Device Tag of the sort specifying buttons 3011, visual verification of the operation history of a field device 2 with a prescribed device tag is facilitated.

The above completes the description of the customized screen of the operation history display sorted by device tags using FIG. 11.

Next, using FIG. 12, a customized operation history display screen sorted by maintenance items will be described. FIG. 12 shows a sample of a customized operation history display screen sorted by maintenance items displayed by the device maintenance apparatus in the embodiment.

In FIG. 12 the customized screen 3000 has sort specifying buttons 3011, an operation history display 3041, and sticky note information 3042. FIG. 12 shows that Input Loop Check of the sort specifying buttons 3011 is selected. The operation history display 3031 displays the operation history for each device tag together. The operation history display 3041 displays only histories of the operation histories related to a loop check. By displaying only histories of the operation histories related to a loop check, a list of operation histories of loop checks executed in a plurality of field devices 2 can be made.

The above completes the description of the customized operation history display sorted by maintenance items using FIG. 12.

Figure 13:
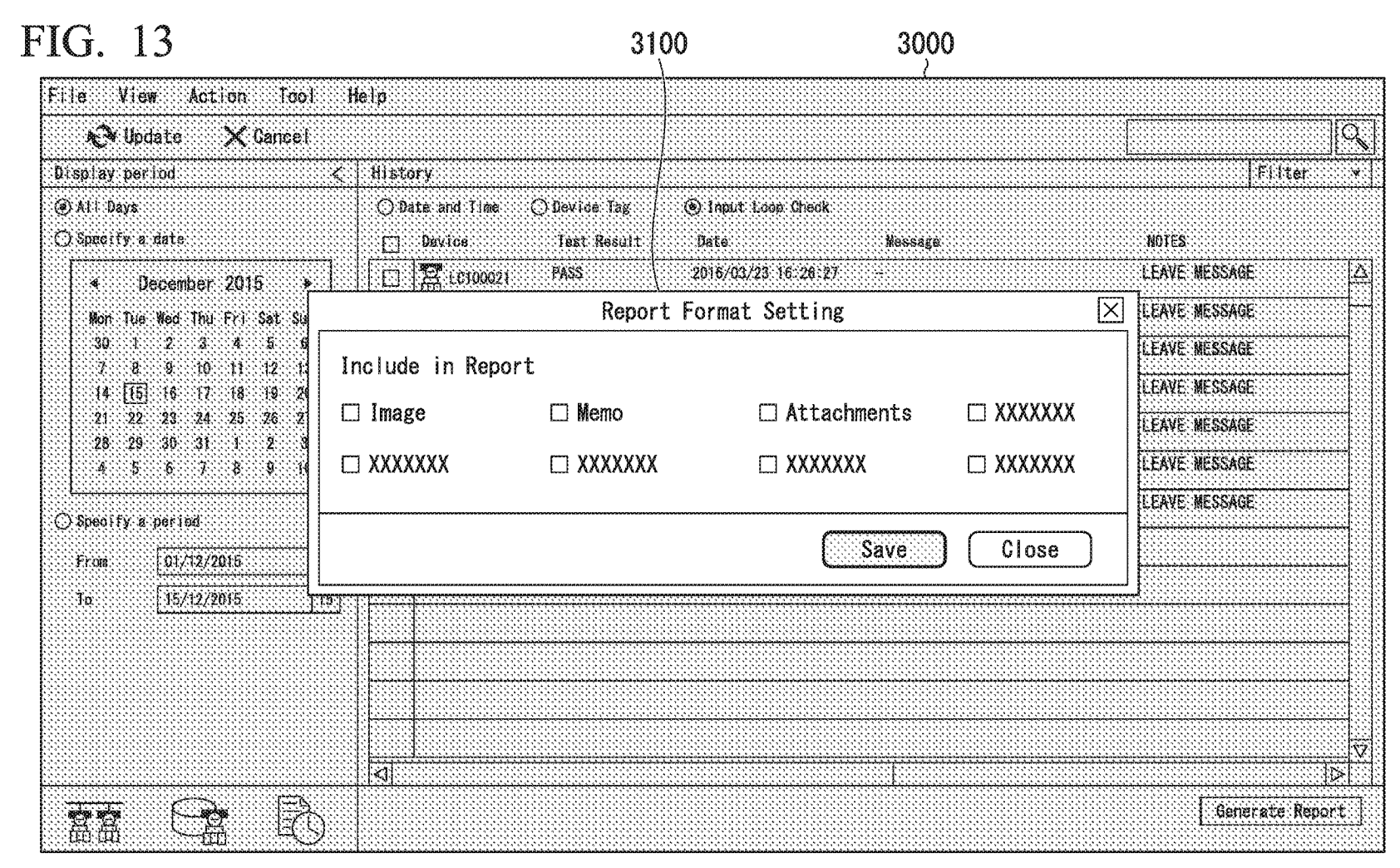

Next, using FIG. 13, the report setting screen will be displayed. FIG. 13 shows an example of the report setting screen displayed by the device maintenance apparatus in the embodiment.

In FIG. 13, a report setting screen 3100 is displayed overlaid on the customized screen 3000. The report setting screen 3100 is a display screen for setting items of parameters to be output as a report. The report setting screen 3100 enables selection of a plurality of items, using checkboxes. The report setting screen 3100 has selection items for Image, Notes, and Attachments. Image specifies output of image data included in the device maintenance information 2000 described in FIG. 8. Notes specifies output of sticky note information included in the device maintenance information 2000. Attachments specify output of attached files included in the device maintenance information 2000. When items are set in the report setting screen 3100, the Save button is pressed to store the setting contents and cause them to be reflected in the report to be output.

The above completes the description of the report setting screen using FIG. 13.

Figure 14:
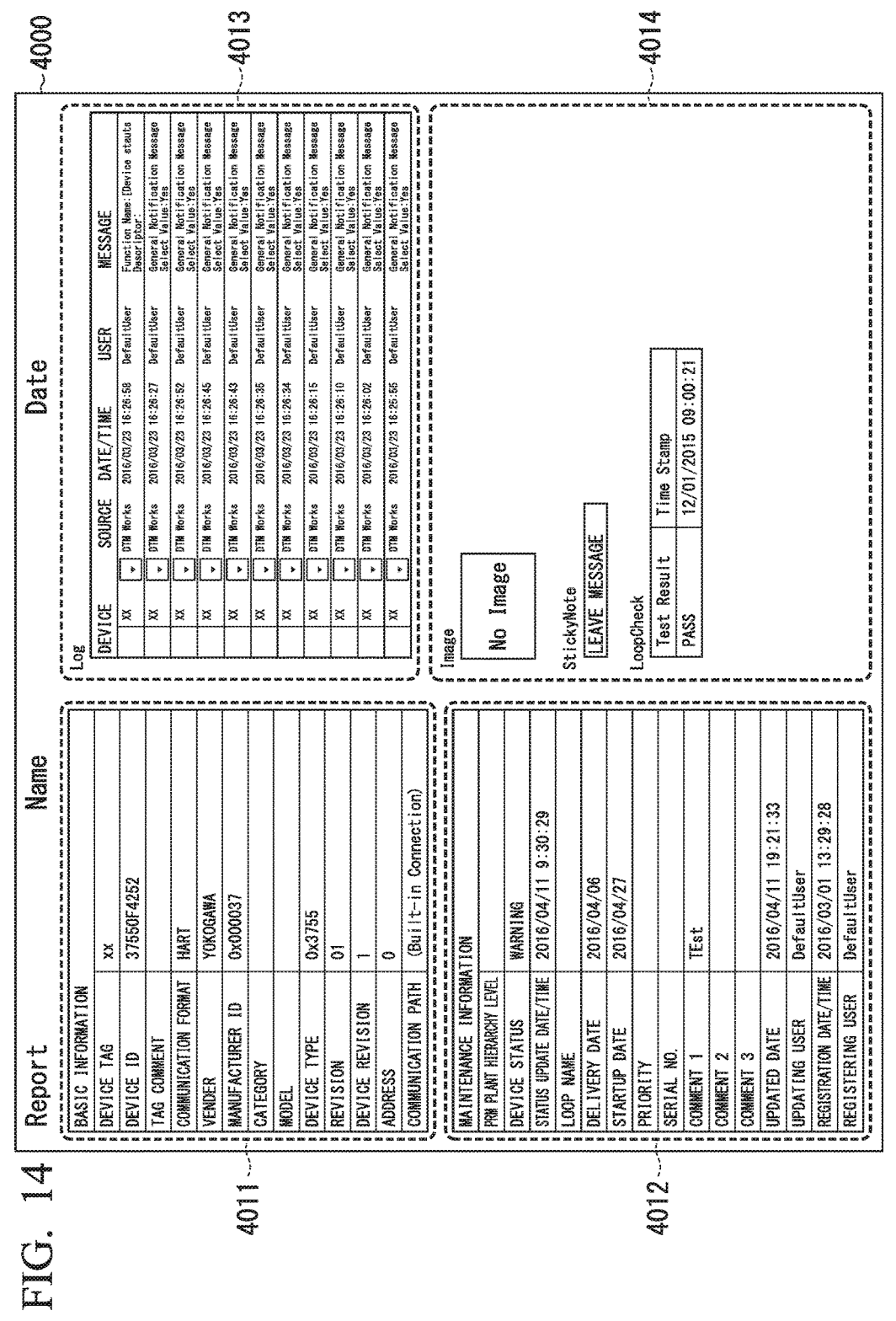

Next, using FIG. 14, the report will be described. FIG. 14 shows an example of a report output by the device maintenance apparatus in the embodiment In FIG. 14, the report 4000 has device information 4011, maintenance information 4012, an operation history 4013, and selection information 4014. The report 4000, for example, can be output (printed) from a printer connected to the device maintenance apparatus 1, or output as electronic data. The customized screen generator 203 described in FIG. 2 performs the laying out of the device information 4011, the maintenance information 4012, the operation history 4013, and the selection information 4014 items in the report 4000. The customized screen generator 203 can, for example, generate the layout of the report 4000 to suit the printer paper.

The device information 4011 is the same display content as the device information 1021 of FIG. 7. The maintenance information 4012 is the same as the maintenance information of FIG. 8. The operation history 4013 is the same as the operation history display 1011 of FIG. 5. The selection information 4014 outputs the same content as specified in the report setting screen 3100 of FIG. 13. That is, because the device maintenance apparatus 100 in the present embodiment can customize the parameters that are output to the report 4000 from the first device information displayed on the main screen and the second device information displayed on the sub screen, it is easy to output the desired device information in the report.

The report 4000 may use a prescribed template and be generated based on the template. A template establishes the items such as parameters to be included in the report 4000 and the layout and the like thereof, and one or a plurality of templates may be selectable from a plurality of templates prepared beforehand. Templates may be created, changed, and deleted. The template may be stored within the device maintenance apparatus 1, such as in a HD drive 14, or may be stored beforehand outside the device maintenance apparatus 1, such as in a server continued via a network, and acquired therefrom.

The items to be included in the report 4000 and the layout thereof in accordance with the template may be made arbitrarily changeable. For example, items such as the name of the creator of the report 4000 and the date and time of creation may be added, and the position of the items and font used and the like may be changed.

The report 4000 may be created separately for each field device or for each model of field device, or for each maintenance item, or created for all the field devices. The report 4000 may be a multipage report output with one-page for each field device.

The report 4000 may be output as electronic data in a specified prescribed format. For example, the report 4000 may be output in a specified file format usable in a spreadsheet application or in a file format usable in a wordprocessing application. The generated electronic file, for example, may be output (uploaded) to a server connected via a network, or may be transmitted as electronic mail. In the present embodiment, because the items included in the report 4000 can be set, the items and the like included in the report 4000 can be changed in accordance with the output destination. For example, a report regarding particular maintenance items with respect to a maintenance worker can be created and transmitted.

The above completes the description of the report using FIG. 14.

As described above, the device maintenance apparatus in the present embodiment is a device maintenance apparatus that has a display that, by displaying a first screen generated based on a first device information of the maintenance-target device, a second screen generated based on a second device information of the device, and a third screen generated based on the first device information and the second device information, can easily output the desired device information.

Although the present embodiment is described for the case in which a main screen that is shown by the example of the first screen, the sub screen that is shown by the example of the second screen, and a customized screen that is shown by the example of the third screen are displayed on the same touch panel 15, these screens may be distributed for display on a plurality of display devices.

A program for implementing the functions of the devices described in the present embodiment may be recorded in a computer-readable recording medium, and a computer system may be made to read-in and execute the program stored in the recording medium, so as to implement the various above-noted processing of the present embodiment. The term "computer system" may include an operating system and hardware such as peripheral devices. The term "computer system" also includes a WWW system having a webpage-providing environment (or webpage-displaying environment). The term "computer-readable recording medium" refers to a writable non-volatile memory such as a flexible disk, an optomagnetic disk, a ROM, a flash memory, a removable media such as a CD-ROM, or the like, or a storage device such as a hard disk or the like built into a computer system.

Additionally, the term "computer-readable recording medium" encompasses one holding a program for a given period of time, such as a volatile memory (DRAM: dynamic random access memory) within a computer system serving as a server or client when a program is transmitted via a network such as the Internet or via a communication line such as a telephone line. The above-noted program may be transferred from a computer system in which the program is stored in a storage apparatus to another computer system, either via a transfer medium, or by a transfer wave in a transfer medium. In this case, the term "transfer medium" transferring a program refers to a medium having a function of transferring information, such as a network (communication network) such as the Internet, or a communication circuit (communication line) such as a telephone line. The above-noted program may be for implementing a part of the above-described functionality. Additionally, it may be a so-called difference file (difference program) enabling implementation in combination with a program that already has recorded the above-noted functionality in a computer system.

Although an embodiment of the present invention has been described, with references made to the drawings, the specific constitution is not restricted to that of the embodiment, and may be variously changes within the scope of the spirit of the present invention.

What is claimed is:

1. A device maintenance apparatus for a plant or factory comprising:
    a display, wherein the display is configured to display at least:
        a first screen generated based on a first device information of a maintenance-target device,
        a second screen generated based on a second device information of the device, and
        a third screen generated based on the first device information and the second device information;
    a device information storage storing the first device information and the second device information associated to each other;
    a main screen generator configured to read the first device information from the device information storage and generate the first screen displaying the read first device information;
    a sub screen generator configured to read from the device information storage the second device information associated with the first device information displayed on the first screen and to generate the second screen displaying the read second device information;
    a selector configured to generate a selection screen for selecting device information to be displayed on the third screen from among at least either one of the first device information displayed on the first screen and the second device information displayed on the second screen; and
    a screen generator configured to generate the third screen displaying the information selected in the selection screen.

2. The device maintenance apparatus according to claim 1,
    wherein the display is configured to display the first screen and the second screen transitionably.

3. The device maintenance apparatus according to claim 1,
    wherein the display is configured to further display the selection screen.

4. The device maintenance apparatus according to claim 1,
    wherein the display is configured to display the third screen on which each set of parameters of a respective one of the maintenance-target devices identified by different identifications is displayed, and wherein displayed positions of the sets of parameters are rearrangeable based on the different identifications over the third screen.

5. The device maintenance apparatus according to claim 1,
    wherein the display is configured to display the third screen on which each set of parameters of a respective one of the maintenance-target devices identified by different maintenance items is displayed, and wherein displayed positions of the sets of parameters are rearrangeable based on the different maintenance items over the third screen.

6. The device maintenance apparatus according to any one of claim 1,
    wherein the display is configured to display on the first screen an operation history display screen that displays the operation history with respect to the device and displays on the second screen a maintenance information display screen that displays information regarding maintenance of the device.

7. A device maintenance apparatus for a plant or factory comprising:
    a display configured to display a first screen generated based on a first device information of a maintenance-target device and a second screen generated based on a second device information of the device;
    a report generator configured to generate a report based on the first device information and the second device information;
    a device information storage storing the first device information and the second device information associated to each other;
    a main screen generator configured to read the first device information from the device information storage and generate the first screen displaying the read first device information;
    a sub screen generator configured to read from the device information storage the second device information associated with the first device information displayed on the first screen and to generate the second screen displaying the read second device information; and
    a selector configured to generate a selection screen for selecting information to be included in the report from among at least either one of the first device information displayed on the first screen and the second device information displayed on the second screen,
    wherein the report generator is configured to generate the report based on the information selected in the selection screen.

8. The device maintenance apparatus according to claim 7,
    wherein the display is configured to further display the selection.

9. The device maintenance apparatus according to claim 7,
    wherein the report generator is configured to generate the report in which each set of information of a respective one of the maintenance-target devices identified by different identifications is included, and wherein displayed positions of the sets of the information are rearrangeable based on the different identifications in the report.

10. The device maintenance apparatus according to claim 7, wherein the report generator is configured to generate the report in which each set of information of a respective one of the maintenance-target devices identified by different maintenance items is included, and wherein displayed positions of the sets of the information are rearrangeable based on the different maintenance items in the report.

11. The device maintenance apparatus according to claim 7, wherein the display is configured to display on the first screen an operation history display screen that displays the operation history with respect to the device and displays on the second screen a maintenance information display screen that displays information regarding maintenance of the device.

12. A device maintenance method for a plant or factory comprising:
displaying a first screen generated based on a first device information of a maintenance-target device;
displaying a second screen generated based on a second device information of the device; and
displaying a third screen generated based on the first device information and the second device information;
reading the first device information from a device information storage storing the first device information and the second device information associated to each other;
generating the first screen displaying the read first device information;
reading from the device information storage the second device information associated with the first device information displayed on the first screen;
generating the second screen displaying the read second device information;
generating a selection screen for selecting device information to be displayed on the third screen from among at least either one of the first device information displayed on the first screen and the second device information displayed on the second screen; and
generating the third screen displaying the information selected in the selection screen.

13. A device maintenance method for a plant or factory comprising:
displaying a first screen generated based on a first device information of a maintenance-target device;
displaying a second screen generated based on a second device information of the device; and
generating a report based on the first device information and the second device information;
reading the first device information from a device information storage storing the first device information and the second device information associated to each other;
generating the first screen displaying the read first device information;
reading from the device information storage the second device information associated with the first device information displayed on the first screen;
generating the second screen displaying the read second device information;
generating a selection screen for selecting information to be included in the report from among at least either one of the first device information displayed on the first screen and the second device information displayed on the second screen; and
generating the report based on the information selected in the selection screen.

14. A non-transitory computer-readable storage medium that stores a computer program, when executed by a computer, to cause the computer to:
display a first screen generated based on a first device information of a maintenance-target device in a plant or factory;
display a second screen generated based on a second device information of the device; and
display a third screen generated based on the first device information and the second device information;
read the first device information from a device information storage storing the first device information and the second device information associated to each other;
generate the first screen displaying the read first device information;
read from the device information storage the second device information associated with the first device information displayed on the first screen;
generate the second screen displaying the read second device information;
generate a selection screen for selecting device information to be displayed on the third screen from among at least either one of the first device information displayed on the first screen and the second device information displayed on the second screen; and
generate the third screen displaying the information selected in the selection screen.

15. A non-transitory computer-readable storage medium that stores a computer program, when executed by a computer, to cause the computer to:
display a first screen generated based on a first device information of a maintenance-target device in a plant or factory;
display a second screen generated based on a second device information of the device; and
generate a report based on the first device information and the second device information;
read the first device information from a device information storage storing the first device information and the second device information associated to each other;
generate the first screen displaying the read first device information;
read from the device information storage the second device information associated with the first device information displayed on the first screen;
generate the second screen displaying the read second device information;
generate a selection screen for selecting information to be included in the report from among at least either one of the first device information displayed on the first screen and the second device information displayed on the second screen; and
generate the report based on the information selected in the selection screen.

* * * * *